Feb. 3, 1925. 1,524,928
J. A. HARDEL ET AL
DEVICE FOR ESTIMATING WEIGHTS BY MEASUREMENTS OF LEVEL
Filed Sept. 3, 1921  3 Sheets-Sheet 1

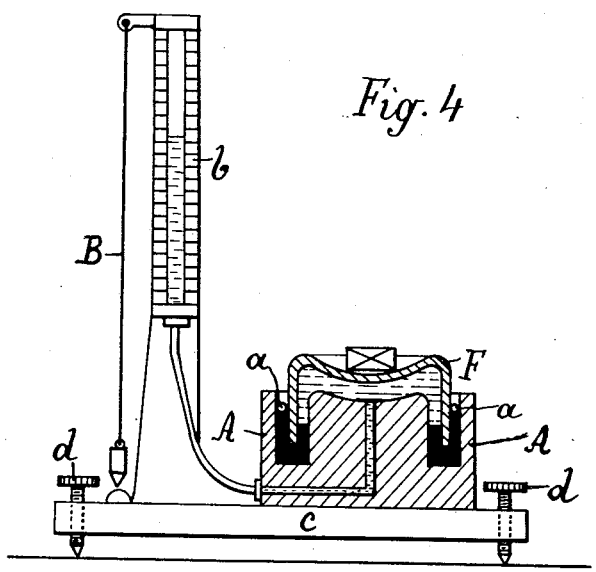
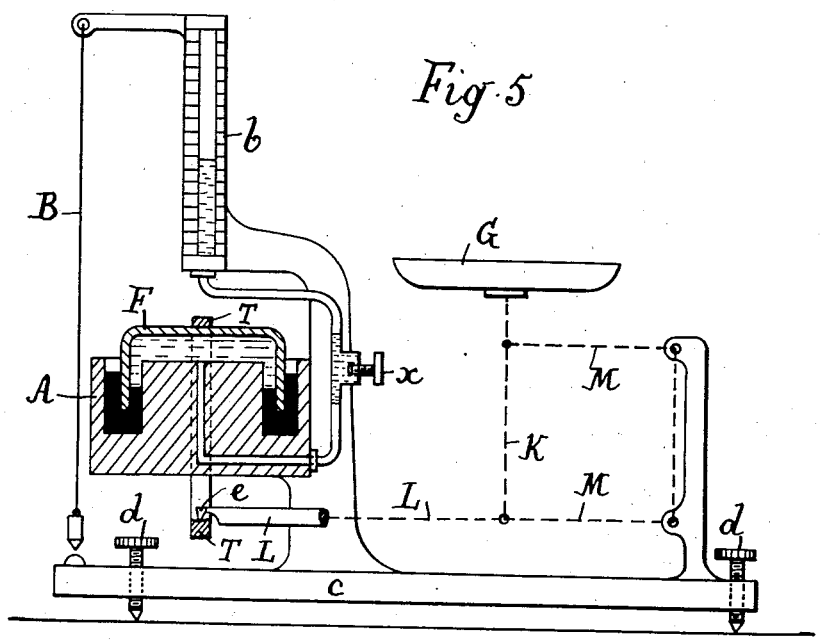

Feb. 3, 1925.
J. A. HARDEL ET AL
1,524,928
DEVICE FOR ESTIMATING WEIGHTS BY MEASUREMENTS OF LEVEL
Filed Sept. 3, 1921
3 Sheets-Sheet 3
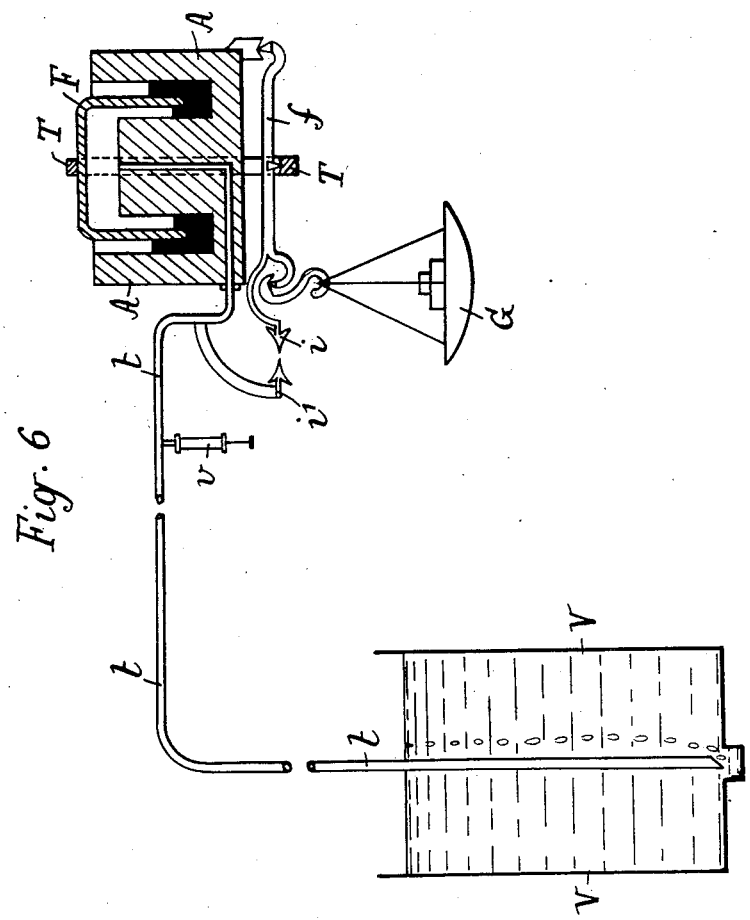

Patented Feb. 3, 1925.

1,524,928

UNITED STATES PATENT OFFICE.

JEAN AMCDIE HARDEL AND JAMES EIBURCE FELIX CONTI, OF PARIS, FRANCE.

DEVICE FOR ESTIMATING WEIGHTS BY MEASUREMENTS OF LEVEL.

Application filed September 3, 1921. Serial No. 498,408.

*To all whom it may concern:*

Be it known that JEAN AMCDIE HARDEL, engineer, citizen of the Republic of France, residing in Paris, France, 63 Boulevard Malesherbes, and JAMES EIBURCE FELIX CONTI, engineer, citizen of the Republic of France, residing in Paris, France, 52 Rue de Clichy, have invented certain new and useful Improvements in Devices for Estimating Weights by Measurements of Level; and they do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to a new application of the laws of hydrostatics, and is characterized by a device comprising a vessel of suitable shape containing a single liquid or several liquids having different densities supporting a float or a bell-shaped member, the said vessel being connected with a tube or a receptacle also containing a liquid, whose height as measured upon a stationary scale has a mathematical relation to the load upon the said float or bell-shaped member, the said mathematical relation being used to deduce, from the ascertained level, the effort brought to bear upon the said float or bell-shaped member, or on the contrary to deduce the height of the column of liquid from the effort exerted upon the said float or bell-shaped member.

This invention may be carried into effect in a great variety of ways, and the accompanying drawings which are of a diagrammatic nature are intended only to illustrate the principle.

Figs. 2 to 6 are diagrammatic views of various embodiments of the said invention.

Figure 1:
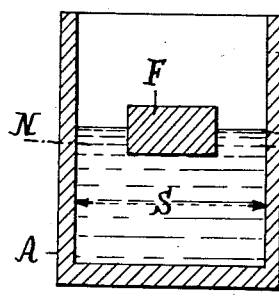
Fig. 1 is a diagram showing the principle of the invention.

Fig. 1 represents a vessel A containing a liquid of known density $d$ up to the level N. If a float F having a weight P is placed in the said vessel, the level will rise by a quantity $h$. It is shown by calculation and by reasoning that the height $h$ is independent of the shape and size of the said float, and that it depends solely upon the weight of the same and the density of the liquid. If the vessel has a uniform section, the equation $h = \frac{P}{Sd}$ may be employed. As a general rule, when a float having a weight P is disposed in a vessel containing a liquid, the level will rise by the same amount as would be produced if the same weight P of the said liquid was poured into the vessel, and the variations of level will be exactly proportional to the weight of the liquid which is added, provided the section of the vessel is constant throughout the height of the same.

Figure 2:
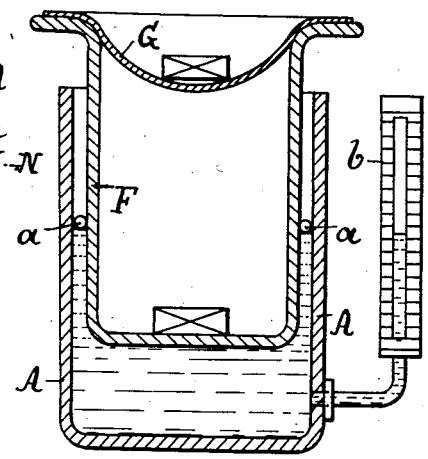
Figure 3:
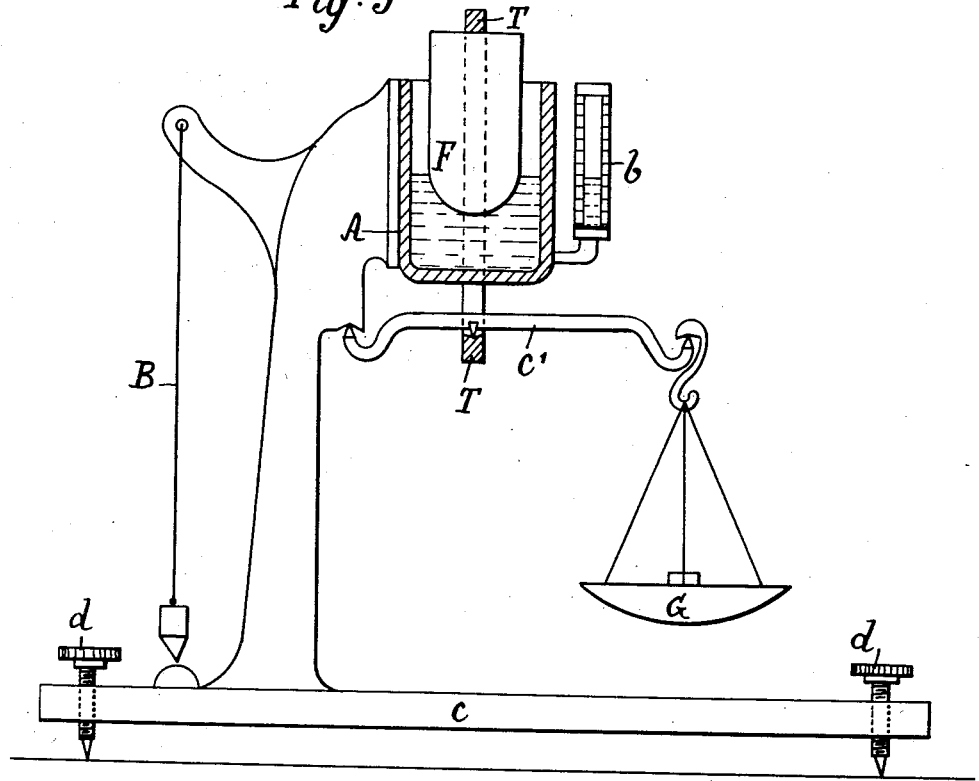

The invention may be carried into effect in a rudimentary manner by the device shown in Fig. 2. In a vessel of constant section, A, is disposed a float F which is ballasted at the lower part in such manner as to maintain the vertical position, and it has placed thereon a scale pan G. The said float is prevented from adhering to the walls by causing balls $a$ having a suitable density to float around the same. At the sides of the vessel is disposed a suitably graduated gauge tube $b$, and in this manner a balance of very simple construction may be produced. Instead of the weight resting directly upon the float, the latter may be acted upon by means of a strap T, Fig. 3, through the medium of a lever $c^1$ provided with three straight knife blades supporting at a suitable point the scale pan G, either directly suspended thereto as shown in Fig. 3, or bearing thereupon by means of an articulated parallelogram similar to the device employed in the Roberval scales, as shown in Fig. 5. By suitably selecting the bearing points, it will be an easy matter to multiply or divide in any desired manner the effort to be furnished by a given weight in order to obtain a given difference of level. The same vessel may even be used for weighing different weights, by changing the scale and the distance between the knife blades.

In this manner the reading is made to correspond to the actual weight irrespectively of the temperature.

The height of the available scale, that is the amount of movement of the liquid in the guage tube $b$, may be considerably increased by making use of two liquids of widely differing densities, whereof one may be for instance mercury, the other being selected in view of preventing the apparatus from undergoing changes with the variations of temperature, and to obviate any appreciable evaporation of the said liquid. The heavy mineral oils fulfill as a rule this condition, and colored vaseline oil may be especially employed.

In order to reduce the amount of mercury employed it is advisable to dispose the same in a vessel of annular section, Fig. 4. In the device which is diagrammatically represented therein, the scale pan consists of a bell-shaped member F acting to compress coloured vaseline oil which rises in the gauge tube $b$ to a considerable height for a small difference in the level of the mercury within and without the member F as thus constituted. In this device, and in the device shown in Fig. 3, the base $c$ of the apparatus is mounted upon the levelling screws $d$; the plumb line B indicates that the apparatus is on the level.

Fig. 5 is a diagrammatic view of a balance making use of two liquids which is similar to the balance with a single liquid shown in Fig. 3. In this mode of construction the bell-shaped member F is acted upon through the medium of the strap T by the knife blade $e$ disposed at the end of the lever L. At a suitable point on the said lever is supported a frame K guided by the articulated frame M. The scale pan G is supported by the frame K.

In the examples above mentioned, the cross sections of the vessels are supposed constant throughout the entire height of the same.

In these applications, the scale $b$ may be constituted by a column of liquid comprised between one or two engraved plates of glass.

It will be observed that the scale $b$ may be situated at any desired point and at any suitable level in the positive or the negative sense with reference to the level of the mercury. The level of the mercury in the external portion may be situated either above or below the level of the mercury within the bell-shaped member. When the height of the mercury level is negative, there will naturally occur a limit which is determined by atmospheric pressure.

The light liquid used for the scale $b$ may rest either directly upon the mercury as in the preceding examples, or it may act through the intermediary of any suitable fluid susceptible of transmitting the pressure, as represented in Fig. 6. The vessel A and the bell-shaped member F are the same as shown in Fig. 5. The said member is acted upon by a scale beam $f$ ending in a pointer $i$ which is to be brought opposite the fixed pointer $i^1$ by adding or taking away the weights on the scale pan G. Supposing that the interior of the bell-shaped member F communicates with a tube $t$ immersed in the vessel V containing a liquid of known density whose level is to be ascertained, it will be sufficient to compress the air in the said tube by means of a small hand pump $v$ until the air escapes at the lower end of the tube. At this moment the pressure in the said tube will correspond to the height of the level of the liquid in the vessel V, and it will then suffice to balance the bell-shaped member by bringing the pointers $i$ and $i^1$ into coincidence. The weight placed in the scale pan in order to produce this result will be directly proportional to the height of the level of the vessel V, whence this latter can be ascertained. If the dimensions of the said vessel are known, the figure for the level will enable the weight of the liquid contained in the vessel to be determined for each observation.

It is obvious that the hereinbefore described devices are given solely by way of example, and are susceptible of various modifications for the purpose of facilitating the use of the same. For instance, screws $x$ may be disposed at suitable points, as shown in Fig. 5, which are adapted to enter the liquid to a greater or less extent in order to vary the volume of the said vessel, whereby the level can be modified with great facility during the adjustment. In the example shown in Fig. 6, the scale pan G may be replaced by a like device for estimating the load upon the bell-shaped member when the equilibrium is obtained.

We claim—

1. A device for measuring weights by liquid level, comprising a vessel, a liquid therein, a bell-shaped float whose edges dip into said liquid and which is depressed by the weight to be measured, means floating on the surface of the liquid between the float and vessel to maintain vertical movement of said float, and a tube connected to the liquid space in said vessel to indicate changes in the liquid level due to weight on said float.

2. A device for measuring weights by liquid level, comprising a vessel, a liquid therein, a tube connected to the vessel by which variations of liquid level may be read, a float in said vessel and liquid depressed by the weight to be measured, and balls floating on the liquid between the vessel and float.

3. A device for measuring weights by liquid level, comprising a vessel, a heavy liquid and a lighter liquid in said vessel, a bell-shaped vessel supported by said liquids and containing the lighter liquid, and a tube opening into the lighter liquid whereby said lighter liquid will indicate the change of level in said tube due to the weight to be measured.

4. A device for measuring weights by liquid level, comprising a vessel, a liquid in said vessel, a bell-shaped float in said vessel and liquid, a tube communicating with the space beneath the float, a scale pan, a pivoted scale pan frame, means to transmit load from said pan and frame to said float and manually operated means projecting into the liquid to adjust the level thereof without removing liquid.

In testimony that we claim the foregoing as our invention, we have signed our names.

JEAN AMCDIE HARDEL.
JAMES EIBURCE FELIX CONTI.